United States Patent [19]

Keating

[11] Patent Number: 5,404,170
[45] Date of Patent: Apr. 4, 1995

[54] TIME BASE CONVERTER WHICH AUTOMATICALLY ADAPTS TO VARYING VIDEO INPUT RATES

[75] Inventor: Stephen M. Keating, Reading, United Kingdom

[73] Assignee: Sony United Kingdom Ltd., Staines, United Kingdom

[21] Appl. No.: 46,134

[22] Filed: Apr. 15, 1993

[30] Foreign Application Priority Data

Jun. 25, 1992 [GB] United Kingdom ............... 9213512

[51] Int. Cl.⁶ ............................................. H04N 7/01
[52] U.S. Cl. .................................... 348/443; 348/458; 348/459
[58] Field of Search ............... 348/443, 447, 458, 459; 358/140; H04N 7/01

[56] References Cited

FOREIGN PATENT DOCUMENTS

| | | |
|---|---|---|
| 3182 | 7/1979 | European Pat. Off. . |
| 0169527 | 1/1986 | European Pat. Off. . |
| 515155 | 11/1992 | European Pat. Off. . |
| WO88/04505 | 6/1988 | WIPO . |

Primary Examiner—James J. Groody
Assistant Examiner—Sherrie Hsia
Attorney, Agent, or Firm—William S. Frommer; Alvin Sinderbrand

[57] ABSTRACT

A time base changer for a video converter for converting between a sequence of input video images at an input video rate and a sequence of output video images at an output video rate is operable to convert from one of a number of input video rates to an output video rate. The time base changer includes N video stores 32 where N is a integer greater than one, each for storing a video image. The video stores are enabled cyclically and at the appropriate input video rate for storing successive input video images in successive video stores. Multiplexers 36 connected to the video stores can output pairs of video images from the video stores at the output video rate. The time base changer includes a counter 38 which can be clocked at the appropriate one of the input video rates. The counter is preferably a modulo-N counter. Control signals for controlling the multiplexer in the selection of the adjacent pairs of video stores preferably includes a samplers 44 for sampling the output of the counter 38 at the output video rate.

18 Claims, 10 Drawing Sheets

FIG. 4

| 60 Hz COUNT -62 | 50 Hz COUNT -64 | -66 | -68 | Write -70 | Read A,B -72 | Interp. -74 |
|---|---|---|---|---|---|---|
| 6 | 6 |   |   | 6 | 6,0 | 0.9 |
| 0 | 1 | 6 |   | 0 | 1,2 | 0.1 |
| 1 | 2 | 1 | 6 | 1 | 2,3 | 0.3 |
| 2 | 3 | 2 |   | 2 | 3,4 | 0.5 |
| 3 | 4 | 3 | 1 | 3 | 4,5 | 0.7 |
| 4 | 5 | 4 | 2 | 4 | 5,6 | 0.9 |
| 5 | 6 | 4 | 3 | 5 | 0,1 | 0.1 |
| 6 | 0 | 5 | 4 | 6 | 1,2 | 0.3 |
| 0 | 1 | 0 | 5 | 0 | 2,3 | 0.5 |
| 1 | 2 | 1 | 0 | 1 | 3,4 | 0.7 |
| 2 | 3 | 2 | 1 | 2 | 4,5 | 0.9 |
| 3 | 4 | 3 | 2 | 3 | 5,6 | 0.1 |
| 4 | 5 | 3 | 3 | 4 | 0,1 | 0.3 |
| 5 | 6 | 4 | 4 | 5 | 1,2 | 0.5 |
| 6 | 0 | 5 | 5 | 6 | 2,3 | 0.7 |
| 0 | 1 | 6 | 6 | 0 | 3,4 | 0.9 |
| 1 | 2 | 0 | 0 | 1 | 4,5 | 0.1 |
| 2 | 3 |   |   | 2 | 6,0 | 0.3 |

| 60 Hz COUNT -76 | 50 Hz COUNT -78 | -80 | -82 | Write -84 | Read A,B -86 | Interp. -88 |
|---|---|---|---|---|---|---|
| 1 | 0 | 0 | 6 | 1 | 6,0 | 0.7 |
| 0 | 0 | 6 | 6 | - | 6,0 | 0.1 |
| 0 | 6 | 6 | 6 | 0 | 5,6 | 0.5 |
| 6 | 6 | 6 | 5 | - | 4,5 | 0.9 |
| 6 | 6 | 5 | 4 | 6 | 4,5 | 0.3 |
| 5 | 5 | 4 | 4 | - | 3,4 | 0.7 |
| 5 | 4 | 4 | 4 | 5 | 3,4 | 0.1 |
| 4 | 4 | 4 | 3 | - | 2,3 | 0.5 |
| 4 | 3 | 3 | 3 | 4 | 1,2 | 0.9 |
| 3 | 3 | 3 | 2 | - | 1,2 | 0.3 |
| 3 | 2 | 2 | 1 | 3 | 0,1 | 0.7 |
| 2 | 2 | 1 | 1 | - | 0,1 | 0.1 |
| 2 | 1 | 1 | 0 | 2 | 6,0 | 0.5 |
| 1 | 1 | 0 | 0 | - |  | 0.9 |
| 1 | 0 | 0 | 6 | 1 |  | 0.3 |
| 0 | 0 | 6 |  | - |  | 0.7 |
| 0 | 6 | 6 |  | 0 |  | 0.1 |
| 6 | 6 |  |  | - |  | 0.5 |
| 6 |  |  |  | 6 |  |  |

FIG. 5

| | | | | | | | | | | | | | | | | | |
|---|---|---|---|---|---|---|---|---|---|---|---|---|---|---|---|---|---|
| 60 Hz COUNT (-136) | 6 | 0 | 1 | 2 | 3 | 4 | 5 | 6 | 0 | 1 | 2 | 3 | 4 | 5 | 6 | 0 | 1 | 2 | 3 |
| 50 Hz COUNT (-138) | 6 | | 1 | 2 | 3 | 4 | 5 | | 6 | 0 | 1 | 2 | 3 | 4 | | 5 | 6 | 0 | 1 | 2 |
| (-140) | | | | 6 | 1 | 2 | 3 | 4 | 5 | | 0 | 1 | 2 | 3 | 4 | 5 | 6 | 0 | 1 |
| (-142) | | 6 | | | | 1 | 2 | 3 | 4 | 5 | | 0 | 1 | 2 | 3 | 4 | | 6 | 0 |
| Write (-144) | 6 | 0 | 1 | 2 | 3 | 4 | 5 | 6 | 0 | 1 | 2 | 3 | 4 | 5 | 6 | 0 | 1 | 2 | 3 |
| Read A,B (-146) | | | 6,0 | | 2,3 | | 4,5 | | 0,1 | | 2,3 | | 4,5 | | 0,1 |
| Read C,D (-148) | | | | 1,2 | | 3,4 | | 5,6 | | 1,2 | | 3,4 | | 5,6 | | 0,1 |
| Interp. A,B (-150) | | 0.9 | | 0.3 | | 0.7 | | 0.1 | | 0.5 | | 0.9 | | 0.3 |
| Interp. C,D (-152) | | | 0.1 | | 0.5 | | 0.9 | | 0.3 | | 0.7 | | 0.1 |

FIG. 9

| | | | | | | | | | | | | | | | |
|---|---|---|---|---|---|---|---|---|---|---|---|---|---|---|---|
| 60 Hz COUNT -154 | 6 | -- | 0 | -- | 1 | -- | 2 | -- | 3 | -- | 4 | -- | 5 | -- | 6 | -- | 0 | -- | 1 |
| 50 Hz COUNT -156 | 5 | 6 | 0 | | 1 | | 2 | 3 | -- | 3 | 4 | | 4 | 5 | | 6 | 6 | 0 | 0 |
| -158 | | | | 6 | 0 | 0 | 1 | | 2 | 3 | 3 | 4 | 4 | 5 | 5 | 6 | 6 | 6 | 0 |
| -160 | | | 6 | 6 | 0 | 1 | 1 | 2 | 2 | 3 | 3 | 4 | 4 | 5 | 5 | 6 | 6 | 6 |
| Write -162 | 6 | -- | -- | -- | 1 | -- | 2 | -- | 3 | -- | 4 | -- | 5 | -- | 6 | -- | 0 | -- | 1 |
| Read A,B -164 | | | 6,0 | | 0,1 | | 1,2 | | 2,3 | | 3,4 | | 4,5 | | 5,6 | | 6,0 |
| Read C,D -166 | | | | | 0,1 | | 1,2 | | 2,3 | | 3,4 | | 4,5 | | | | 6,0 |
| Interp. A,B -168 | | | 0.5 | | 0.7 | | 0.9 | | 0.1 | | 0.3 | | 0.5 | | 0.7 | | |
| Interp. C,D -170 | | | | | 0.1 | | 0.3 | | 0.5 | | 0.7 | | 0.9 | | | | 0.1 |

FIG. 10

TIME BASE CONVERTER WHICH
AUTOMATICALLY ADAPTS TO VARYING VIDEO
INPUT RATES

BACKGROUND OF THE INVENTION

1. Field of the Invention

The invention relates to a time base changer suitable for use in a video converter for converting between a sequence of input video images at an input video rate and a sequence of output video images at an output video rate and to a video converter incorporating such a time base changer.

2. Description Of the Prior Art

Video converters are well known devices used to convert video signals from one video standard to another, for example, from an input interlaced high definition video signal (HDVS) having 1125 lines per frame and 60 fields per second into an output interlaced video signal having 625 lines per frame and 50 fields per second.

FIG. 1 is a schematic block diagram of a previously proposed video standards converter for the down conversion from high definition video signals (HDVS) in accordance with a standard of, say, 1125 lines, 60 Hz, and 2:1 interlace to normal definition video signals in accordance with a standard of, say, 625 lines, 50 Hz rand 2:1 interlace. The previously proposed video standards converter provides compensation for the effects of the movement of features between input video fields. The video standards converter 10 comprises a down converter 16 for receiving the high definition input signals 12. The input video signals are converted to a progressive format (i.e. the 2:1 interlace is removed) in accordance with a motion adaptive interpolation scheme in which interframe interpolation is employed in static picture areas and interfield interpolation is employed on moving material within the picture. This 1125 line, 60 Hz, 1:1 progressive format is then converted to 625 line, 60 Hz, 1:1 format which is then output via path 18 to a time base changer 20.

The time base changer 20 has the function of converting from the input frames at an input rate of 60 Hz to output frames at an output rate of 50 Hz. The output from the time base changer on lines 22 comprises two streams of video images, A and B, each at 50 Hz and a stream of interpolation coefficients, I, also at 50 Hz. It will be appreciated that less frames are needed at 50 Hz than at 60 Hz. Whereas the input to the time base changer has 60 frames per second, the output on each of the channels A and B from the time base changer has only 50 frames per second. Accordingly, it can be seen that the output video rate on each of the channels from the time base changer requires only 5/6 of the number of frames as at the input video rate.

The primary function of the time base changer 20 is to compute which input frames are required from the sequence of input video frames in order to generate the output sequence of video frames. The time base changer selects one of the input video frames to be output on each of the respective channels A and B for each output video frame. Each pair of frames on the channels A and B is passed to an interpolator 24 which responds to an interpolation coefficient generated by the time base changer. Each interpolation coefficient defines interpolation factors for combining the pair of frames output on the channels A and B in order to generate a corresponding output video frame.

The process of generating an output frame has to take account of the possible movement of objects within the image. If a feature moves from a first to a second image position on two successive frames of the input video, simple interpolation of those two frames will result in blurring that feature. In order to take account of this, a vector processor 26 is provided. The vector processor 26 calculates a position which is temporally (e.g. half way) between the position of the feature in two successive input frames. Each of these frames is then offset by half the amount of motion estimated between the two frames to align the features of the two images prior to interpolation. Further details of vector processing for motion compensation in a video standards converter can be found in GB-A-2 213 749.

The existing time base converter is designed for a fixed conversion between input video provided at a first frequency for generating output at a second frequency (i.e. from 60 to 50 Hz ). If, however, the input video is derived from a 30 Hz progressive scan input, e.g. from a computer graphics source, the conversion from 30 Hz to 50 Hz requires a time base changer to select different pairings of the input video frames and different interpolation factors for combining those input video frames. In the prior art a completely separate time base changer was necessary to deal with input video signals produced at different video rates.

SUMMARY OF THE INVENTION

An object of the invention is to provide a time base changer which can automatically adapt to input video sequences at different video rates.

In accordance with the present invention, there is provided a time base changer for a video converter for converting between a sequence of input video images at an input video rate and a sequence of output video images at an output video rate, the time base changer comprising N video stores, where N is an integer greater than one, each for storing a video image, means for enabling the video stores cyclically in turn and at the input video rate for storing successive input video images in successive video stores, multiplexer means connected to the video stores for outputting the video image stored therein, control means successively providing multiplexer control signals at the output video rate to the multiplexer means for selecting adjacent pairs of the video stores such that a sequence of pairs of the video images are output from the video stores via the multiplexer means at the output video rate, wherein the input video rate is a selectable one of a plurality of rates and wherein the enabling means comprises a counter clocked at the selected input video rates.

The provision in the enabling means of a counter which is clocked at the input video rate of the received sequence of video images means that the input video images can be stored in the video stores cyclically in turn at the appropriate input video rate.

Preferably the counter is a modulo-N counter so that the output of the counter can readily be converted into signals for enabling the video stores cyclically in sequence. Preferably this is achieved by means of a decoder which is connected to the output of the modulo-N counter, each of N outputs from the decoder being connected to a write enable input of the respective one of the video stores, whereby each count of the modulo-N counter enables a different one of the video stores.

Advantageously, the control means includes means for sampling the output of the counter at the output video rate for generating the sequence of multiplexer control signals. This enables the automatic selection of the video stores from which images are read for forming the output; sequence of video images irrespective of the input video rate of the received images. The sampling means preferably comprises a clocked register, the register being clocked at the output video rate.

Preferably, the control means comprises delay means connected to the output of the sampling register and clocked at the output video rate. This enables the output of the multiplexer control signals from the control means to be timed such that the images it is required to read out from the video stores are available in the video stores. In the preferred embodiment of the invention the delay means comprises two delay buffers clocked at the output video rate.

In one embodiment of the invention the multiplexer means comprises a pair of multiplexers, the control means includes an output stage including means for incrementing modulo-N the output of the delay means and the control means produces first multiplexer control signals from the output of the delay means for controlling the first of the pair of multiplexers and produces second multiplexer control signals from the output of the modulo-N incrementing means for controlling the second of the pair of multiplexers, whereby the pair of multiplexers selects the sequence of pairs of the video images from adjacent video stores at the output video rate.

Preferably, the time base changer also comprises an interpolation counter clocked at a rate higher than the input video rate and reset at the input video rate, count sampling means clocked at the output video rate for sampling the output of the interpolation counter, a coefficient memory connected to the output of the count sampling means whereby the output of the count sampling means addresses the coefficient memory for outputting interpolation coefficients at the output video rate and in synchronism with the generation of corresponding pairs of video images, each interpolation coefficient defining interpolation factors for combining a respective pair of video images to generate the sequence of output video images at the output video rate.

In an alternative embodiment of the invention, the multiplexer, where m is an integer greater than one, means comprises a plurality of m pairs of multiplexers and the control means includes m output stages, one for each respective pair of multiplexers, each of said output stages including an additional sampling means for sampling the output of the delay means at one mth of the output video rate and means for incrementing modulo-N the output of the additional sampling means, the control means producing first multiplexer control signals from the output of the additional sampling means for controlling the first multiplexer of the pair of multiplexers and producing second multiplexer control signals from the output of the modulo-N incrementing means for controlling the second multiplexer of the pair of multiplexers, whereby the pair of multiplexers selects the sequence of pairs of the video images from adjacent video stores at one mth of the output video rate and wherein the additional sampling means of a first of said output stages is connected to the output of the delay means and wherein the additional sampling means of a second of said output stages is connected to the output of the delay means via a delay stage clocked at the output video rate.

In this embodiment, the time base changer also includes an interpolation counter clocked at a rate higher than the input video rate and reset at the input video rate, count sampling means clocked at the output video rate for sampling the output of the interpolation counter, a coefficient memory connected to the output of the count sampling means whereby the output of the count sampling means addresses the coefficient memory for outputting interpolation coefficients at the output video rate, and m interpolation coefficient output stages, each comprising a further sampling means clocked at one mth of the output video rate, for outputting interpolation coefficients at one mth of the output video rate and in synchronism with the generation of the corresponding pairs of video images from the respective pairs of multiplexers, each interpolation coefficient defining interpolation factors for combining the respective pair of video images to generate an output video image.

In this embodiment, the time base changer preferably comprises delay means clocked at the output video rate for ensuring that the interpolation coefficients are supplied in synchronism with the generation of the corresponding pairs of video images.

In the preferred embodiment of the invention, the input video rate is either 30 or 60 Hz. However, it will be appreciated that the invention is not limited these specific input video rates.

Similarly, the in the preferred embodiment of the invention the output video rate is 50 Hz, although the invention is not limited to this specific output frequency.

Advantageously, there are seven frame stores (i.e. N=7). This provides for reliable conversion of the input to output video sequences with the minimum of hardware.

As used in a video standards converter of the type illustrated in FIG. 1, the video stores are frame stores. However, in other embodiments the video stores of the time base changer could be field stores.

The invention also provides a video standards converter for converting between a sequence of input video images at an input video rate and a sequence of output video images at an output video rate comprising a time base changer as claimed in any one of the preceding claims.

BRIEF DESCRIPTION OF THE DRAWINGS

Embodiments of the invention will now be described by way of example with reference to the accompanying drawings in which:

FIG. 4 is a timing diagram for explaining the operation of the time base changer of FIG. 2 for an input video sequence at a 60 Hz video rate;

FIG. 5 is a timing diagram for explaining the operation of the time base changer of FIG. 2 for an input video sequence at a 30 Hz video rate;

FIG. 9 is a timing diagram for explaining the operation of the time base changer of FIG. 7 for an input video sequence at a 60 Hz video rate;

FIG. 10 is a timing diagram for explaining the operation of the time base changer of FIG. 7 for an input video sequence at a 30 Hz video rate.

DESCRIPTION OF THE PREFERRED EMBODIMENTS

Figure 1:
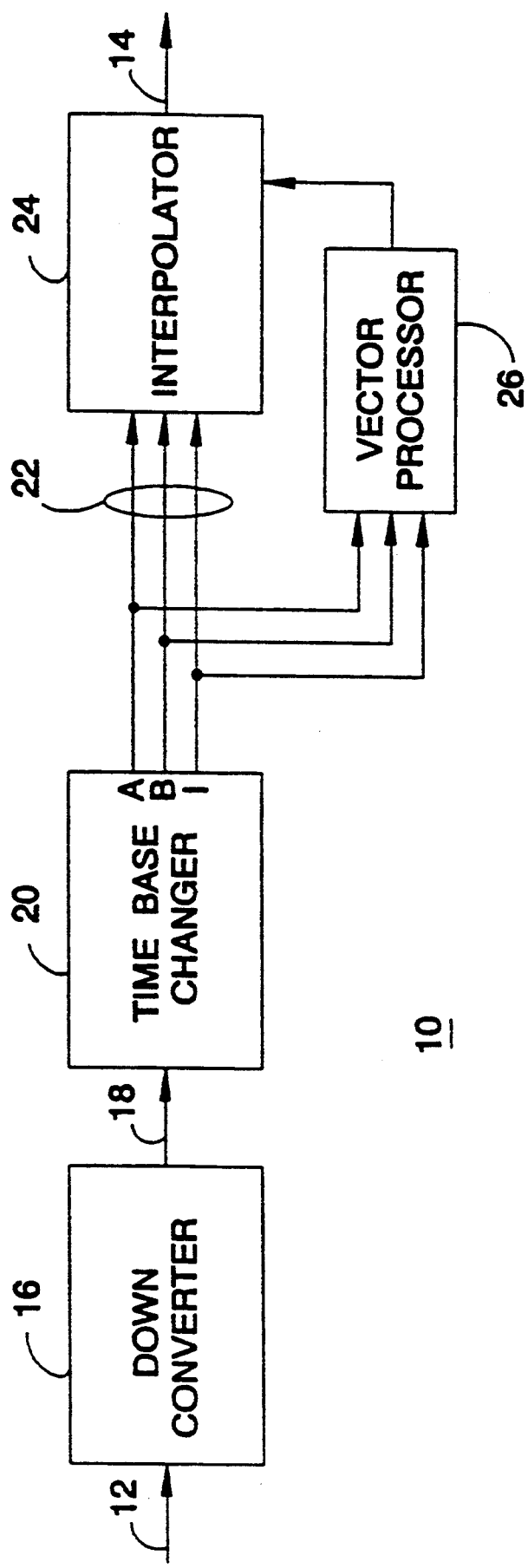
FIG. 1 is a block diagram of a previously proposed motion compensated television standards converter.
Figure 2:
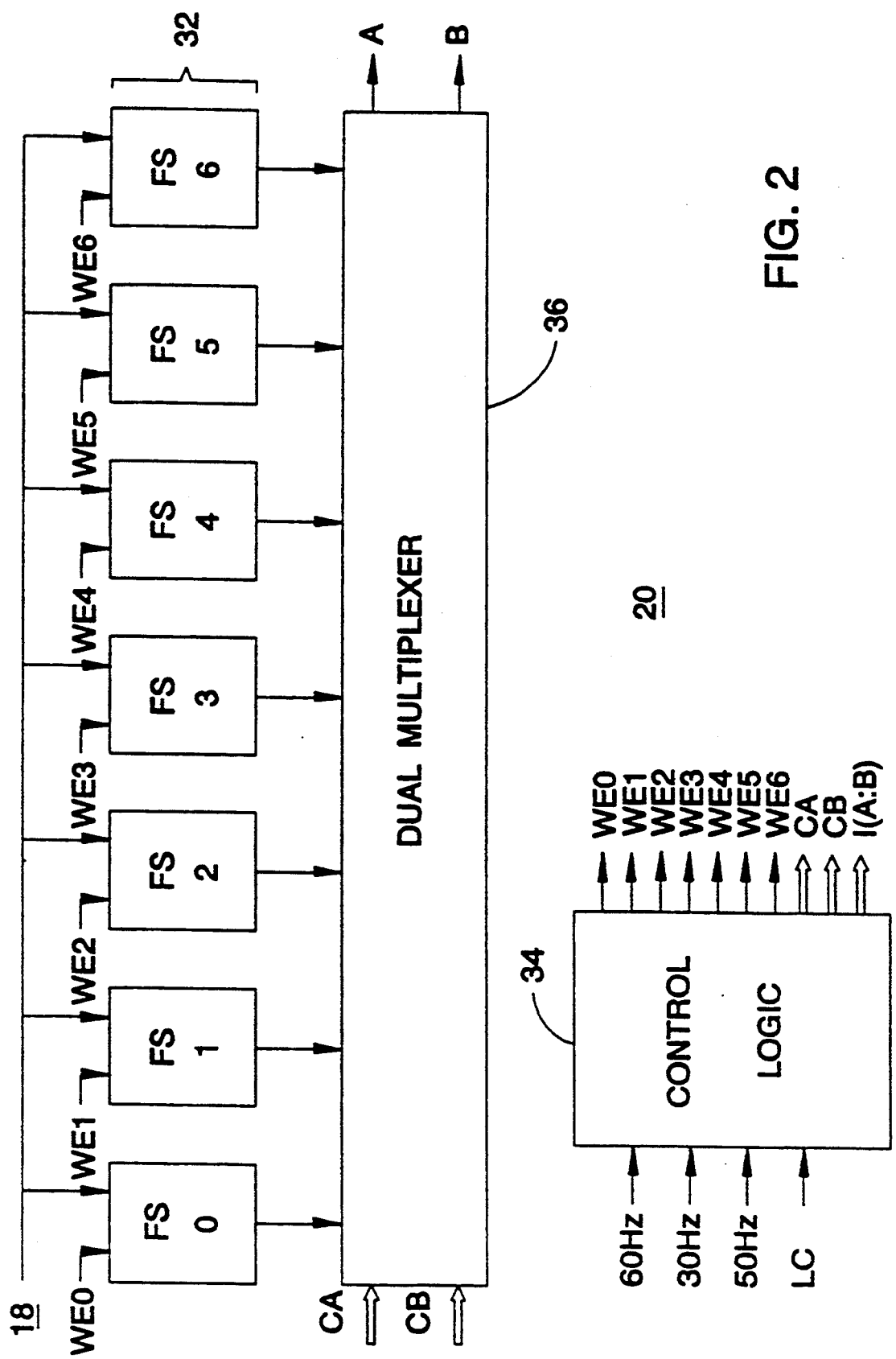
FIG. 2 is a schematic diagram of a first example of a time base changer in accordance with the invention.

FIG. 2 is a schematic block diagram of a time base changer in accordance with the invention which is suitable for use in a video standards converter generally of the type described with reference to FIG. 1, but able to automatically adapt to input video sequences at different video rates.

The time base changer of FIG. 2 comprises 7 frame stores FS0-FS6 which together form a video buffer 32. Successive frames of input video from video data path 18 are supplied to the input of the frame stores FS0-FS6. Write enable signals WE0-WE6 are supplied sequentially in a cyclical manner (WE0, WE1, WE2, WE3, WE4, WE5, WE6, WE0, WE1, etc. ) and at the input video frame rate whereby successive frames of input video are stored in successive ones of the frame stores FS0-FS6 in a cyclical manner.

The write enable signals WE0-WE6 are provided by control logic 34 which receives the input frame synchronization signals of 60 Hz or 30 Hz. The operation of the control logic will be described hereinafter in more detail with reference to FIGS. 3 to 5.

A dual multiplexer (i.e. a pair of multiplexers) 36 is connected to the output of each of the frame stores FS0-FS6, whereby at any one time, the output from two frame stores may be selected. The dual multiplexer 36 provides two output channels A and B. At any one time, each of the channels (i.e. a respective one of the individual pair of multiplexers ) provides video signals from a respective one of the frames stores FS0-FS6 as selected by the multiplexer control signals (i.e. multiplexer control counts). The dual multiplexer 36 receives a first multiplexer control count CA for selecting one of the frame stores FS0-FS6 which, at any one time, is to be connected to the first output A of the multiplexer. The dual multiplexer 36 also receives a second multiplexer control count CB for selecting the one of the frame stores FS0-FS6 which, at any one time, is to be connected to output B of the multiplexer.

The counts CA and CB are both generated by the control logic 34 to be described in more detail hereinafter with reference to FIGS. 3 to 5. In general terms, however, the control logic 34 produces a sequence of pairs of select signals CA and CB which are provided to the 2-way multiplexer 36 to select a sequence of pairs of frame stores from which input video frames are output to the interpolator 24. The control logic 34 also generates an interpolation coefficient for each pair of selected frames. Each interpolation coefficient defines interpolation factors for combining the pixel data from the pair of selected video frames to generate an output video frame. As inputs the control logic receives input video rate clocks (here 60 or 30 Hz), which can be generated from the frame synchronisation signals of the input video, an input frequency line frequency clock LC, which can be generated from the line retrace signals of the input video and the output video rate clock (here 50 Hz) which can be generated in synchronism with the generation of the output video. The final output of the interpolator 24 on output 14 is a 625 line, 50 Hz 2:1 interlace television standard. In other words, one of the functions of the interpolator 24 is to generate interlaced video fields from the frames combined in the interpolator.

Figure 3:
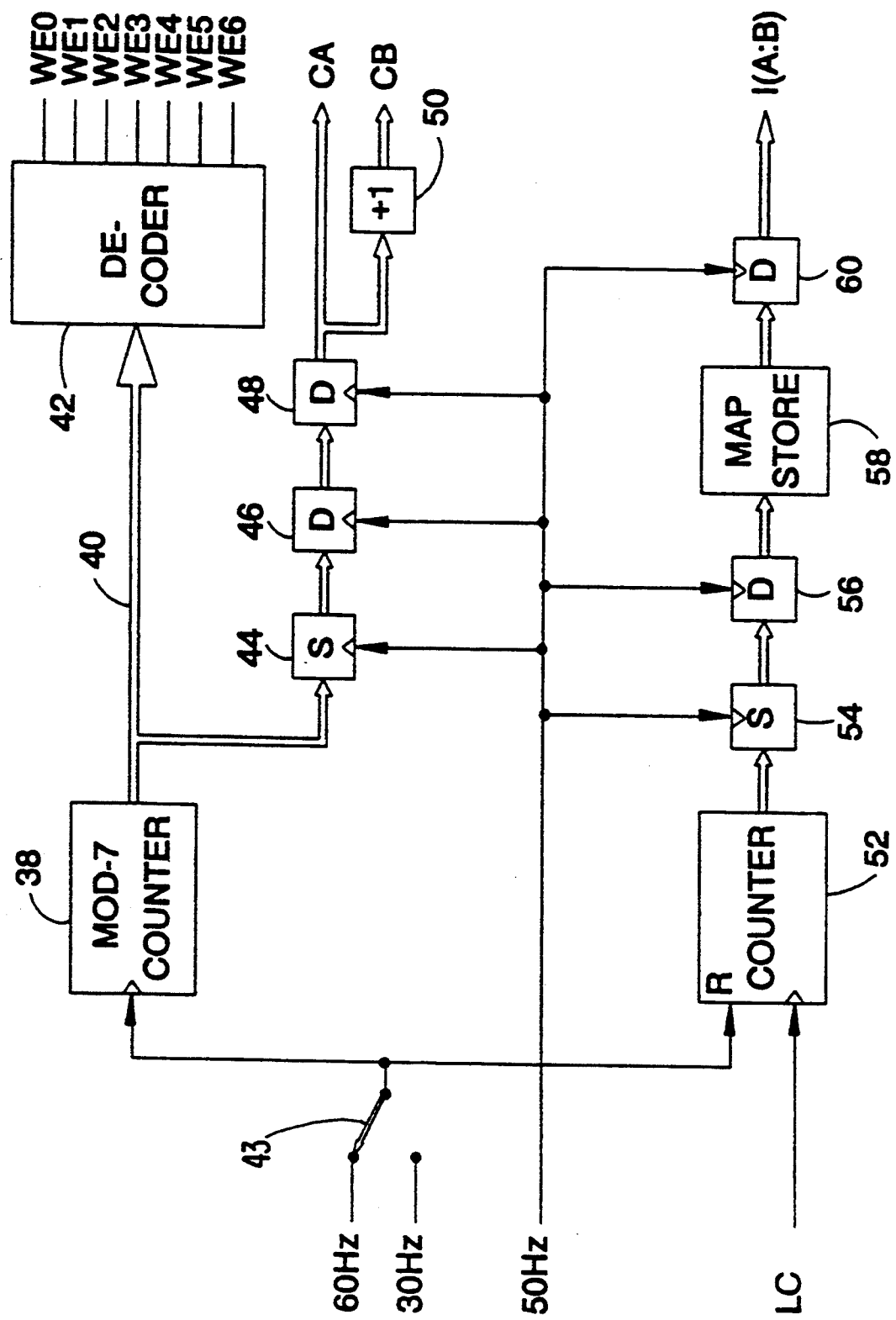
FIG. 3 is a schematic diagram of control logic of the time base changer of FIG. 2.

FIG. 3 is a schematic block diagram illustrating the control logic 34 of FIG. 2 in more detail. The structure of the control logic will now be described. The operation of the control logic will be described in more detail thereafter with reference to FIGS. 4 and 5. The input video clock (here 60 or 30 Hz) is supplied to the count input of a modulo-7 counter 38. This 60 or 30 Hz clock signal causes the modulo-7 counter 38 to cycle through the count 0, 1, 2, 3, 4, 5, 6, 0, 1, . . . with the count changing once in synchronism with each successive input video frame as received. This can be achieved by taking the frame synchronisation signals from the input video sequence as the 60 or 30 Hz clock. The current count of the modulo-7 counter 38 is supplied via lines 40 to a decoder 42. The decoder 42 converts the current count into a write enable signal (WE0-WE6) for a corresponding frame store FS0-FS6). The result of this is that successive frames of input video are stored in successive ones of the frame stores FS0-FS6 as they are received.

When the input video sequence is a sequence of frames provided at a 60 Hz rate, the 60 Hz signal is supplied to the clock input of the modulo-7 counter 38. In other words, the modulo-7 counter 38 increments once every 60th of a second. If, on the other hand, the input video sequence relates to frames provided at a 30 Hz rate, a 30 Hz signal is "supplied to the clock input of the modulo-7 counter 38. In this case, the modulo-7 counter increments 30 times per second. Although, for the purposes of explanation, a switch 43 is shown in FIG. 3 to enable the selection of a 60 Hz or a 30 Hz input, in practice the production of the 60 or 30 Hz signal can be achieved automatically by sampling the frame synchronization signals from the input video sequence.

As well as being connected to the decoder 42, the output 40 of the modulo-7 counter is connected to a sampler 44. The sampler 44 can be implemented in the form of a clocked buffer register. The sampler 44 is clocked at the output video rate, in the example of FIG. 3 at 50 Hz. The use of the sampler 44 ensures that the output of the modulo-7 counter 38 is sampled 50 times per second. The counts sampled by the sampler 44 are passed via first and second delay buffers 46 and 48, both clocked at the output video rate. The output of the second delay buffer 48 forms the first multiplexer control count CA for controlling the first multiplexer channel of the dual multiplexer 36. The second multiplexer control signal CB is generated by incrementing, modulo-7, the output of the second delay buffer 48 in a modulo-7 incrementer 50.

The combination of the sampler 44 and the modulo-7 incrementer 50 means that a pair of address counts CA and CB are generated 50 times a second, i.e. at the output video rate. The sampler 44, sampling at 50 Hz, ensures that counts CA and CB are generated automatically irrespective of whether the modulo-7 counter is clocked at 60 Hz or 30 Hz or indeed at any other input data rate. The delay stages 46 and 48 ensure that the multiplexer control counts CA and CB are delayed sufficiently to enable storage of the frames of input video before they are required for output via the multiplexer 36.

In the preferred embodiment of the invention, the frame stores are implemented using dual-ported memories such that data may be read out at one rate while data at the same time is being written to that memory, possibly at a different rate. It is, however important that the data which is needed to be read has already been stored at the appropriate locations in the video store. In this particular embodiment, video data is stored sequentially line-by-line in the video store. Accordingly, before the last lines of a video frame have been stored, the reading of the first lines of video data (already stored) can commence. The use of dual-ported memories is not essential to the invention, but it facilitates the timing of the reading and writing cycles. As a result of this, it also meant that it was easier to provide a time base changer with a video buffer having only seven frame buffers. More frame buffers could have been used, but this would have increased the complexity and expense of the time base changer.

The input video rate signal (60 or 30 Hz) is also connected to the reset input of a counter 52. In the preferred embodiment, the counter 52 is able to count to at least 625 (i.e. the number of lines in a frame of video input from the down converter 16 to the time base changer 20). The clock input to the counter 52 is connected to receive a line count pulse responsive to the line scan signals for the lines of each frame of video supplied to the time base changer 20. The counter 52 counts up from zero either 60 or 30 times per second depending on whether a 60 or 30 Hz input is supplied to the reset input of that counter. The current count of the counter 52 is sampled by a sampler 54, which like the sampler 44 can be implemented as a clocked register. The sampler 54 is clocked by the same clock as the sampler 44 at the output video rate, in the present case 50 Hz. The sampled count output by the sampler 54 is passed 50 times per second to a delay stage 56, also clocked at the output video rate. The output of the delay stage 56 is used as an address to access a mapping store 58 which contains interpolation coefficients for determining interpolation factors for combining the pixel values of the video images selected by the multiplexer control counts CA and CB. The output of the mapping store 58 is further delayed by another delay buffer 60, also clocked at the output video rate. The output I(A:B) is formed of a series of values at the output video rate. Each of the values provided at the output I(A:B) is synchronised with the pair of select values CA and CB to which it relates through the use of the sampling and delays clocked in common in response to the output video clock rate.

The use of the sampler 54 in combination with the counter 52 enables a value to be output from the sampler 54 which is representative of the proportion of the input video clock pulse which has passed through a time slot by the time the output pulse occurs. This enables an appropriate interpolation coefficient to be determined. The mapping store 58 defines the relationship between the count output by the sampler 54 and the interpolation coefficients, which can be expressed numerically as a percentage, as a fraction or as a ratio. Although, in the present embodiment the counter 52 is clocked by the line synchronisation pulses, it could be clocked by some other means as long as the signal used to clock the counter 52 is at a sufficiently high rate to enable the position within a frame of input video at which each 50 Hz output video signal occurs to be determined accurately.

FIG. 4 is a timing diagram illustrating the operation of the circuit; of FIG. 3 for input images provided at 60 Hz. The horizontal axis in FIG. 4 is the time axis.

Each box in the first line 62 represents 1/60th of a second. The numbers in the boxes in the first line 62 represent the count of the modulo-7 counter 38 for each 60th of a second when the modulo-7 counter 38 is driven by a 60 Hz input signal. The leading (left-hand) edge of each box represents the timing of the input, 60 Hz, video clock pulses.

The second line 64 in FIG. 4 represents the output clock timings. Each of the boxes in line 64 represents 1/50th of a second. The leading (left-hand) edge of each box represents the timing of the output, 50 Hz, video clock pulses. The relative horizontal positions of the edges of the boxes in line 64 with respect to line 62 indicate the timing of the 50 Hz signal with respect to the 60 Hz signal. The numbers in the boxes in the second line 64 represent the count which is sampled by the sampler 44 for each successive 50 Hz pulse as defined by the leading edge of each of the boxes in the line 64. Comparison of the lines 64 and 62 will show that the effect of the sampler 44 is automatically to discard certain of the counts output by the modulo-7 counter 38. Thus, for example, the first count of 0 in line 62 is not sampled. Similarly, the second count of 6 is discarded, as is the second count of 5.

The third line 66 in FIG. 4 represents the output of the sampler 44 delayed by one output frame (50 Hz time period) by the delay buffer 46.

The fourth line 68 in FIG. 4 represents the output of the delay buffer 46 further delayed by one output frame (50 Hz time period) by the delay buffer 48.

The content of each of the boxes in the fifth line 70 in FIG. 4 represent the frame stores (the numerals 0–6 correspond to the references FS0–FS6) into which respective video frames are stored. It will be seen that the frame store numbers in the boxes in line 70 correspond to the counts represented in the corresponding boxes of the first line 62.

The content of each of the boxes in the sixth line 72 in FIG. 4 represents the multiplexer control counts CA and CB separated by a comma for respective 50 Hz time slots. The number before the comma is the select signal. CA which corresponds to the output of the delay buffer 48 for the corresponding time slot. The number after the comma is the control count CB which equals CA+1 (modulo-7), that is the output of the modulo-7 incrementer 50 of FIG. 3.

The bottom line 74 in FIG. 4 represents the sequence of interpolation coefficients generated from the mapping store 58. Each of the numbers in the boxes in the bottom line in FIG. 4 represents the interpolation coefficient produced in synchronism with the output of the corresponding pair of multiplexer control counts CA and CB to which it relates.

Comparison of lines 64 and 62 in FIG. 4 will indicate the derivation of the interpolation coefficients. It can be seen that the left hand edge of the first box in line 64 is about 9/10th of the way through the first box of line 62. In other words, the interpolation coefficient 0.9 in the left hand box of line 74 indicates that 10% of each pixels value of the image from the frame store FS6 should be combined with 90% of the corresponding pixel value of the image from the frame store FS0 to form the first output video frame. It can be seen that the left hand edge of the second box in line 64 is about 10% along the third box of the first line 62 in FIG. 4. Accordingly, the interpolation coefficient 0.1 in the second box in line 74 indicates that 90% of each pixel value of the image from the field store FS1 should be combined with 10% of the corresponding pixel value of the image from the frame store FS2. It can be seen that the interpolation coefficients for successive boxes in the line 74 can be generated by adding 0.2 to the interpolation coefficient of the preceding box and taking the figure after the decimal point.

FIG. 5 is a timing diagram illustrating the operation, of the circuit of FIG. 3 for input images provided at 30 Hz. The horizontal axis in FIG. 5 is the time axis.

Each box in the first line 76 represents 1/60th of a second. The numbers in the boxes in the first line 76 represent the count of the modulo-7 counter 38 for each 60th of a second when the modulo-7 counter 38 is driven by a 30 Hz input signal. The leading (left-hand) edge of alternate boxes (i.e. between boxes with different numbers) represents the timings of the input, 30 Hz, video clock pulses.

The second line 78 in FIG. 5 represents the output clock timings. Each of the boxes in line 78 represents 1/50th of a second. The leading (left-hand) edge of each box represents the timing of the output, 50 Hz, video clock pulses. The relative horizontal positions of the edges of the boxes in line 78 with respect to line 76 indicate the timing of the 50 Hz signal with respect to the 30 Hz signal. The numbers in the boxes in the second line 78 represent the count which is sampled by the sampler 44 for each successive 50 Hz pulse, as defined by the leading edge of each of the boxes in the line 78. Comparison of the lines 78 and 76 will show that the effect of the sampler 44 is automatically to repeat certain of the counts from the modulo-7 counter 38, but not to repeat others of the counts. Thus, for example, the first count of 6 and the counts of 2, and 5 are not repeated in the sequence illustrated in line 78 of FIG. 5.

The third line 80 in FIG. 5 represents the output of the sampler 44 delayed by one output frame (50 Hz time period) by the delay buffer 46.

The fourth line 82 in FIG. 5 represents the output of the delay buffer 46 further delayed by one output frame (50 Hz time period) by the delay buffer 48.

The numbers in the boxes in the fifth line 84 in FIG. 5 represent the frame stores (the numerals 0–6 correspond to the references FS0–FS6) into which respective video frames are stored. It will be seen that the frame store numbers in alternate boxes in line 844 correspond to the counts represented in the corresponding boxes in the first line 76.

The content of each of the boxes in the sixth line 86 in FIG. 5 represents the multiplexer control counts CA and CB separated by a comma for respective 50 Hz time slots. The number before the comma is the control count CA which corresponds to the output of the delay buffer 48 for the corresponding time slot. The number after the comma is the control count CB which equals CA+1 (modulo-7), that is the output of the modulo-7 incrementer 50 of FIG. 3.

The bottom line 88 in FIG. 5 represents the sequence of interpolation coefficients generated from the mapping store 58. Each of the numbers in the boxes in the bottom line in FIG. 5 represents the interpolation coefficient produced in synchronism with the output of the corresponding pair of multiplexer control counts CA and CB to which it relates.

Comparison of lines 78 and 76 in FIG. 5 will indicate the derivation of the interpolation coefficients in this case. It can be seen that the left hand edge of the First box in line 78 is about half way between the left hand of the First pair of boxes in line 76. In other words, the interpolation coefficient 0.5 in the left hand box of line 88 indicates that 50% of each pixels value of the image from the frame store FS6 should be combined with 50% of the corresponding pixel value of the image from the frame store FS0 to form the first output video frame (the first box in line 86 indicates that the images from frame stores FS6 and FS0 are to be combined to form the first output video frame). It can be seen that the left hand edge of the second box in line 78 is about 10% along the second pair of boxes in the first line 76. Accordingly, the interpolation coefficient 0.1 in the second box in line 88 indicates that 90% of each pixel value of the image from the field store FS0 should be combined with 10% of the corresponding pixel value of the image From the frame store FS1 (the second box in line 86 indicates that the images from frame stores FS0 and FS1 are to be combined to form the second output video frame). It can be seen that the interpolation coefficients for successive boxes in the line 88 can be generated by adding 0.6 to the interpolation coefficient of the preceding box and taking the figure after the decimal point.

Comparison of FIGS. 4 and 5 will illustrate that the time base changer of FIGS. 2 and 3 is able automatically to select successive pairs of video frames from the frame stores FS0–FS6 and automatically to generate corresponding interpolation coefficients, irrespective of the input frequencies.

It will be appreciated that line 72 in FIG. 4 and line 86 in FIG. 5 only show part of the sequences of pairs of video images output by the multiplexers. Given the part of the sequence shown in those Figures, it will be apparent that this can be extrapolated to give a repeating sequence. By way of example, the full repeating sequence of pairs for the 30 Hz case (FIG. 5) is as follows: 6,0; 0,1; 0,1; 1,2; 1,2; 2,3; 3,4; 3,4; 4,5; 4,5; 5,6; 6,0; 6,0; 0,1; 0,1; 1,2; 2,3; 2,3; 3,4; 3,4; 4,5; 5,6; 5,6; 6,0; 6,0; 0,1; 1,2; 1,2; 2,3; 2,3; 3,4; 4,5; 4,5; 5,6; 5,6.

Figure 6:
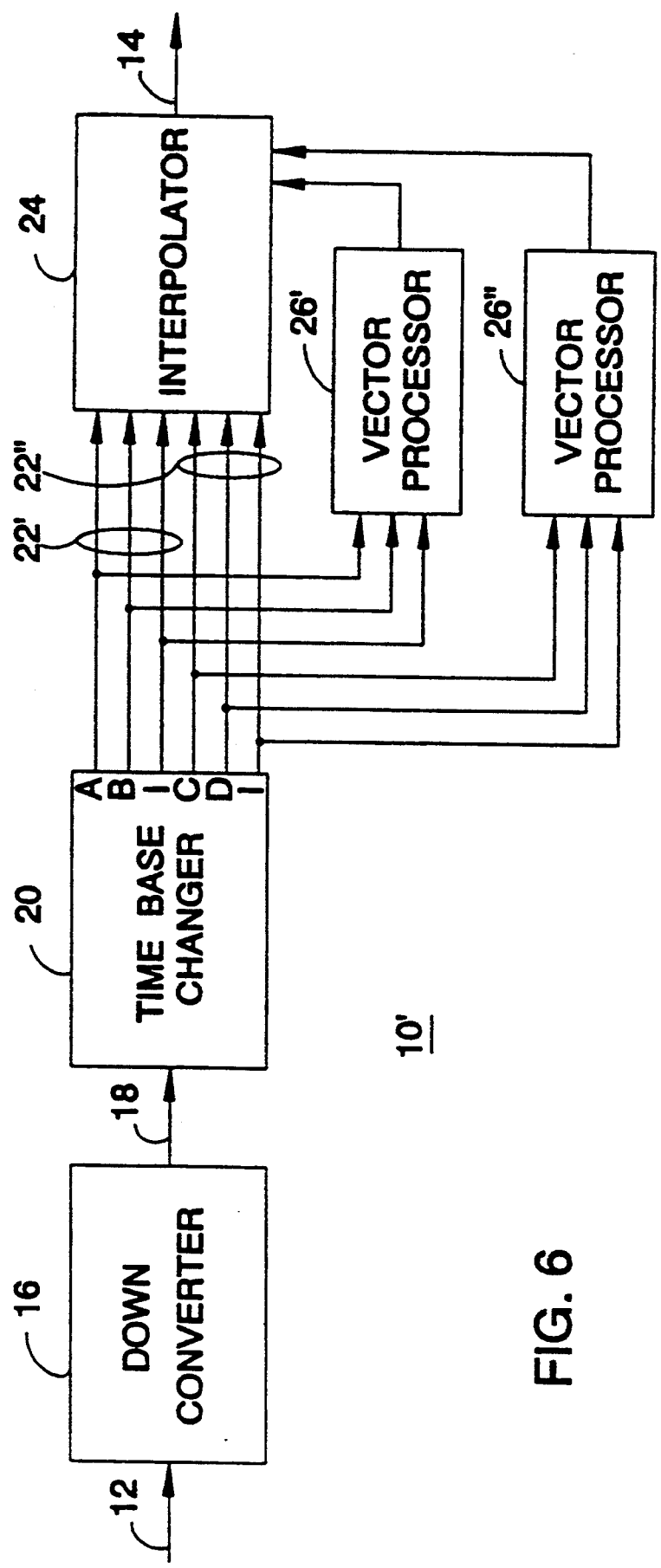
FIG. 6 is a block diagram of an alternative motion compensated television standards converter.

The time base changer described with reference to FIGS. 2 to 5 is adapted for use with a video standards converter as illustrated in FIG. 1. The motion compensation processing is a relatively computing intensive task. Accordingly, in order to provide high quality motion compensation in real time using available technology, it has been proposed to duplicate the vector processor 26 of FIG. 1 with each vector processor processing alternate pairs of frames output from a time base changer. FIG. 6 is a schematic block diagram of such a video standards converter 10'. The video standards converter 10' is generally similar to the video standards converter 10 of FIG. 1, except that the time base circuit produces two sets of outputs 22' and 22", rather than one set, there are two vector processors 26' and 26", rather than one, and the interpolator 24' receives duplicated inputs. Pairs of video frames with associated interpolation coefficients are output from the time base changer alternately on output 22' (A/B/I) and on output 22" (C/D/I). These alternate pairs of video frames are processed by the vector processors 26' and 26", respectively, and by the interpolator 24'. The result of the processing, as before, is 625 line, 50 Hz 2:1 interlaced video.

Figure 7:
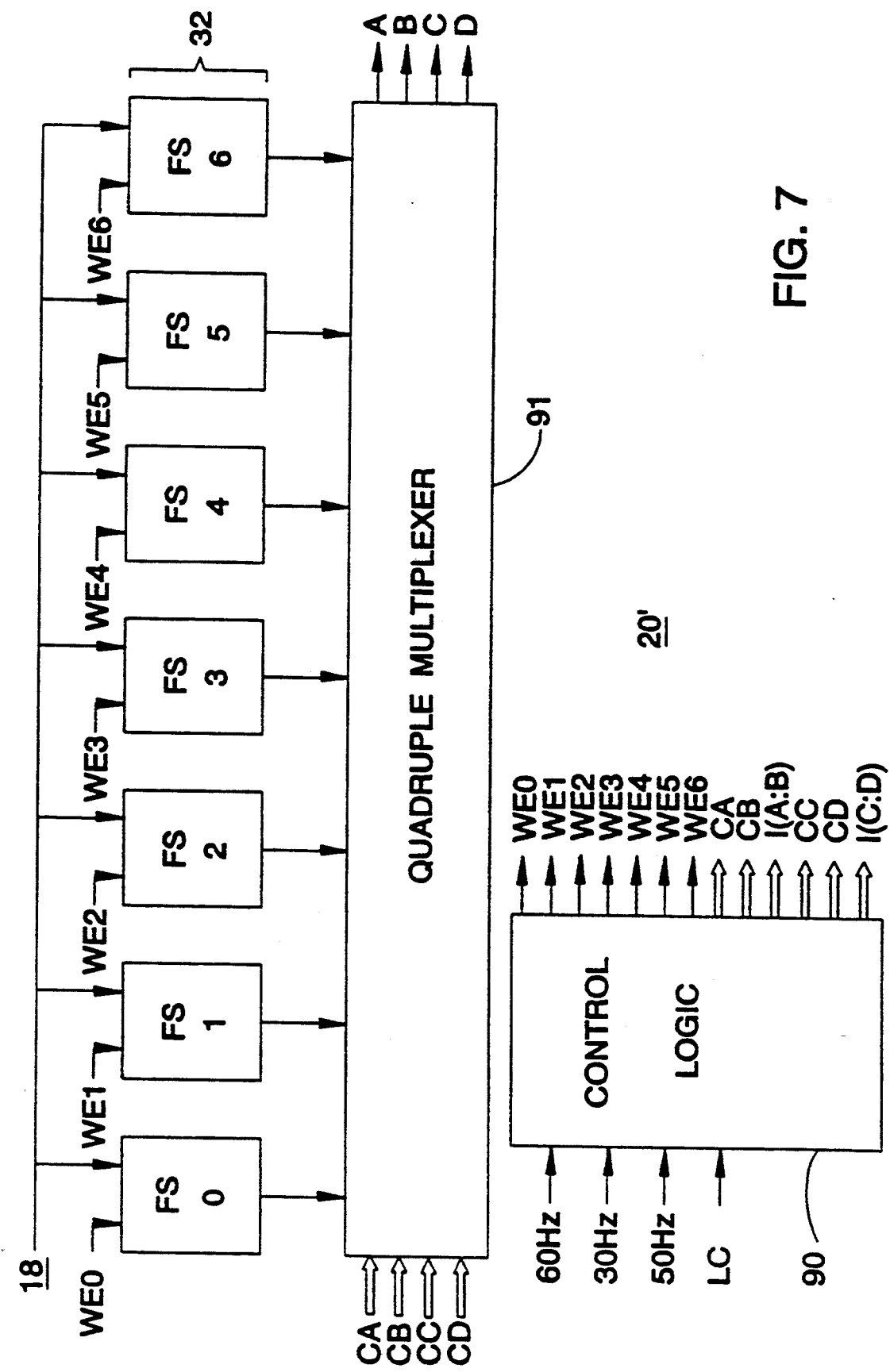
FIG. 7 is a schematic diagram of a second example of a time base changer in accordance with the invention.

FIG. 7 is a schematic block diagram of a time base changer in accordance with the invention which is suitable for use in a video standards converter generally of the type illustrated in FIG. 6. The time base changer of FIG. 7 is able to automatically adapt to input video sequences at different video rates. The time base changer 20' of FIG. 7 has a similar overall structure to the time base changer 20 of FIG. 20. Like reference numerals are used to identify like parts.

Thus, the time base changer of FIG. 7 comprises 7 frame stores FS0–FS6 which together form a video buffer 32. Successive frames of input video from video data path 18 are supplied to the input of the frame stores FS0–FS6. Write enable signals WE0–WE6 are supplied sequentially in a cyclical manner (WE0, WE1, WE2, WE3, WE4, WE5, WE6, WE0, WE1, etc. ) and at the input video frame rate whereby successive frames of input video are stored in successive ones of the frame stores FS0–FS6 in a cyclical manner.

The write enable signals WE0–WE6 are provided by control logic 90 which receives the input frame synchronization signals of 60 Hz or 30 Hz. The operation of the control logic 90 will be described hereinafter in more detail with reference to FIGS. 8 to 10.

A quadruple multiplexer (i.e. two pairs of multiplexers) 91 is connected to the output of each of the frame stores FS0–FS6, whereby at any one time, the output from four frame stores may be selected. The quadruple multiplexer 91 provides four output channels A, B, C and D. At any one time, each of the channels (i.e. a respective one of the individual pair of multiplexers) provides video signals from a respective one of the frames stores FS0–FS6 as selected by the multiplexer control signals (i.e. multiplexer control counts). The quadruple multiplexer 91 receives first, second, third and fourth control counts CA, CB, CC and CD each for selecting one of the frame stores FS0–FS6 which, at any one time, is to be connected to the first, second, third and fourth outputs A, B, C and D of the quadruple multiplexer 91.

The counts CA, CB, CC and CD are generated by the control logic 90, along with interpolation coefficients for each of the first and second pairs of channels (A:B and C:D) in a manner to be described hereinafter with reference to FIGS. 8 to 10. For inputs the control logic receives input video rate clocks (here 60 or 30 Hz), which can be generated from the frame synchronisation signals of the input video, an input frequency line frequency clock LC, which can be generated from the line retrace signals of the input video and the output video rate clock (here 50 Hz), which can be generated in synchronism with the generation of the output video. The final output of the interpolator 24 on output 14 is a 625 line, 50 Hz 2:1 interlace television standard. In other words, one of the functions of the interpolator 24 is to generate interlaced video fields from the frames combined in the interpolator.

Figure 8:
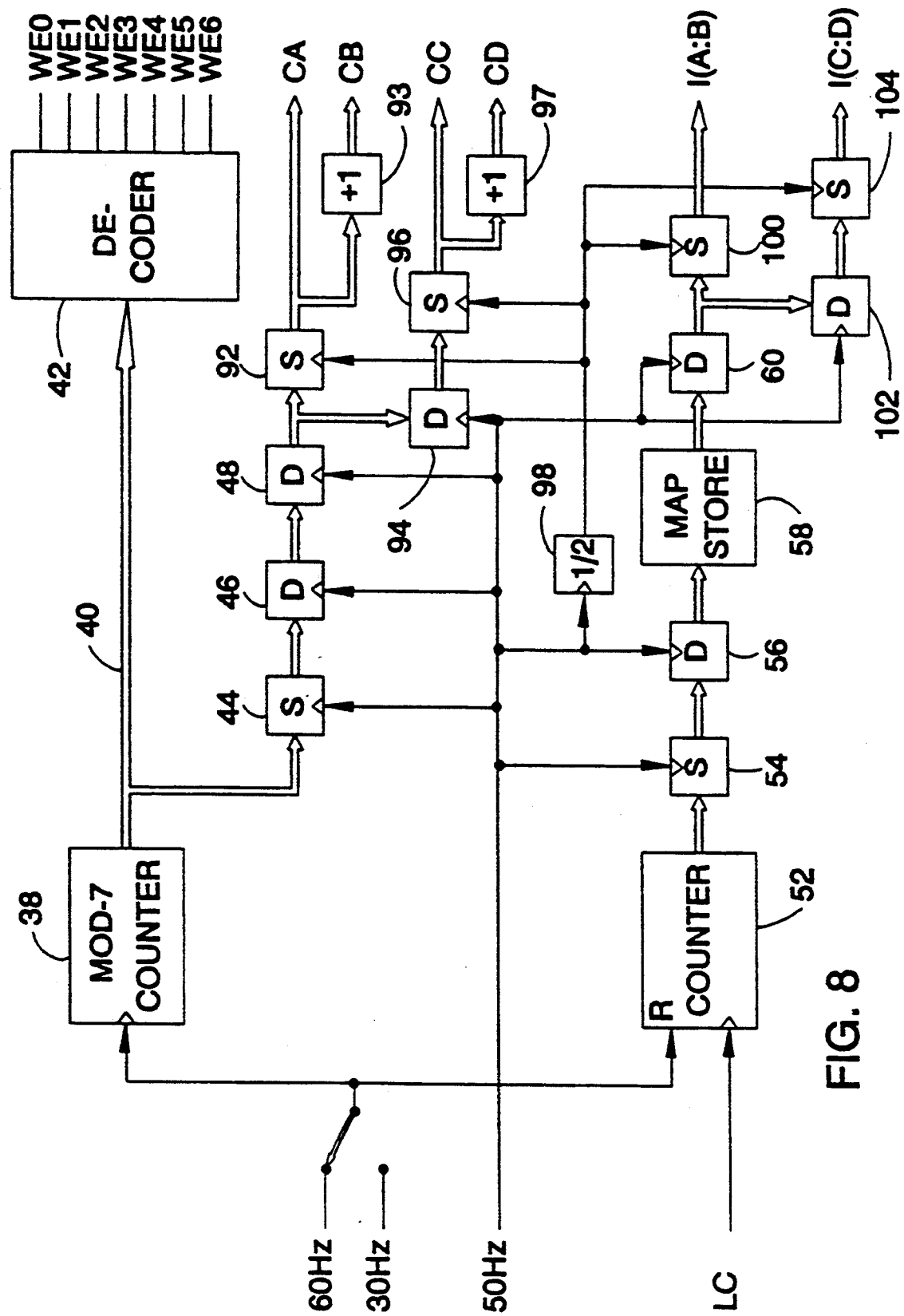
FIG. 8 is a schematic diagram of control logic of the time base changer of FIG. 7.

FIG. 8 is a schematic block diagram illustrating the control logic 90 of FIG. 7 in more detail. The structure of the control logic 90 will now be described. The operation of the control logic 90 will be described in more detail thereafter with reference to FIGS. 9 and 10. The control logic 90 comprises many of the same components as the control logic 34 described with reference to FIG. 3. Like components are given like numerals in both Figures.

As in the control logic 34, the input video clock (here 60 or 30 Hz) is supplied to the count input of a modulo-7 counter 38 causing it to cycle through the counts 0, 1, 2, 3, 4, 5, 6, 0, 1, . . . with the count changing once in synchronism with each successive input video frame as received in response to the input video clock. Once again, this can be achieved by taking the frame synchronisation signals from the input video sequence as the 60 or 30 Hz clock. The current count of the modulo-7 counter 38 is supplied via lines 40 to a decoder 42 which converts the current count into write enable signals (WE0–WE6) for the frame stores FS0–FS6). The result of this is that successive frames of input video are stored in successive ones of the frame stores FS0–FS6 as they are received.

The output 40 of the modulo-7 counter is also connected to a sampler 44, which can be implemented in the form of a clocked buffer register and is clocked at the output video rate (here, as in FIG. 3, at 50 Hz). The sampler 44 samples the output of the modulo-7 counter 50 times per second. The counts sampled by the sampler 44 are passed via first and second delay buffers 46 and 48, both clocked at the output video rate.

In this embodiment of the invention, the output of the second delay buffer 48 is supplied to two separate output paths. Each of the output paths generates control signals for a respective one of the pairs of multiplexers. In particular, a first output path comprising a sampler 92 and a modulo-7 incrementer 93 generates first and second multiplexer control counts CA and CB for the first pair of multiplexers with outputs A and B, whereas a second output path comprising a delay 94, a sampler 96 and a modulo-7 incrementer 97 generates third and fourth multiplexer control counts CC and CD for the second pair of multiplexers with outputs C and D.

The sampler 92 is controlled by a 25 Hz signal generated by dividing the 50 Hz output video clock by two in a divider 98. The sampler 92 ensures that alternate samples output by the sampler 44 are processed by the first output path. The output of the sampler 92 forms the first select control count CA for controlling the first multiplexer channel of the first pair of multiplexers of the quadruple multiplexer 91. The second multiplexer control count CB is generated by incrementing, modulo-7, the output of the sampler 92 in a modulo-7 incrementer 93. The combination of the sampler 92 and the modulo-7 incrementer 93 means that a pair of address counts CA and CB are generated 25 times a second, i.e. at half the output video rate.

The sampler 96 is also controlled by the same 25 Hz signal as the sampler 92. However, the delay buffer 94, which is clocked by the 50 Hz output video clock to give a one frame delay, means that the sampler 96 selects the alternate samples from the sampler 44 which were not selected by the sampler 92. The samples selected by the sampler 96 are processed by the second output path. The output of the sampler 96 forms the third select control signal CC for controlling the first multiplexer channel of the second pair of multiplexers of the quadruple multiplexer 91. The fourth multiplexer control signal CD is generated by incrementing, modulo-7, the output of the sampler 96 in a modulo-7 incrementer 97. The combination of the delay 94, the sampler 96 and the modulo-7 incrementer 97 means that a pair of multiplexer control counts CC and CD are generated 25 times a second, i.e. at half the output video rate, simultaneously with but relating to alternate output video rate timings as the pair of multiplexer control counts CA and CB. The sampler 44, sampling at 50 Hz, ensures that counts CA, CB, CC and CD are generated automatically irrespective of whether the modulo-7 counter is clocked at 60 Hz or 30 Hz or indeed at any other input data rate. The delay stages 46 and 48 ensure that the multiplexer control counts CA and CB are delayed sufficiently to enable storage of the frames of input video before they are required for output via the multiplexer 91.

As in the case of the first preferred embodiment, the frame stores are implemented using dual-ported memories such that data may be read out at one rate while data at the same time is being written to that memory, possibly at a different rate. The video data is stored sequentially line-by-line in each video store. Accordingly, before the storage of the last lines of a video frame, the reading of the first lines of video data (already stored) can commence. The use of dual-ported memories is not essential, but it does facilitate the timing of the reading and writing cycles.

The input video rate signal (60 or 30 Hz) is also connected to the reset input of a counter 52 which is able to count to at least 625 (i.e. the number of lines in a frame of video input from the down converter 16 to the time base changer 20).

The counter 52 is the same as in the embodiment of the control logic illustrated in FIG. 3, and is also clocked by the line scan signals for the lines of each frame of video supplied to the time base changer 20. The current count of the counter 52 is sampled by a sampler 54, which, as in the FIG. 3 embodiment, is clocked by the same clock as the sampler 44 at the output video rate. The sampled count output by the sampler 54 is passed 50 times per second to a delay stage 56, also clocked at the output video rate. The output of the delay buffer 56 is used as an address to access the mapping store 58 which contains interpolation coefficients for determining interpolation factors for combining the pixel values of the video images selected by the multiplexer control counts CA, CB, CC and CD. The output of the mapping store 58 is further delayed by a further delay buffer 60, also clocked at the output video rate.

In this embodiment of the control logic, the output of the delay buffer 60 is processed by two separate interpolation output paths, one for each of the multiplexer pairs (A:B and C:D). The first interpolation control output path includes a sampler 100 and produces interpolation coefficients fop the pairs of video frames output by the first pair of multiplexers. The second interpolation control output path comprises a delay buffer 102 and a sampler 104.

The sampler 100 is controlled by the 25 Hz signal output by the divider 98. The sampler 100 ensures that alternate samples output by the sampler 52 are processed by the first interpolation output path. The output I(A:B) forms a series of values at the half the output video rate. Each of the values provided at the output I(A:B) is synchronised with the pair of multiplexer control counts CA and CB to which it relates through the use of the sampling and delays which respond in common to the output video clock rate.

The sampler 104 is also controlled by the same 25 Hz signal as the sampler 100. However, the delay buffer 102, which is clocked by the 50 Hz output video clock to give a one frame delay, means that the sampler 104 selects the alternate samples from the sampler 54 which were not selected by the sampler 100. The output I(C:D) also forms a series of values at the half the output video rate. Each of the values provided at the output I(C:D) is synchronised with the pair of multiplexer control counts CC and CD to which it relates through the use of the sampling and delays which respond in common to the output video clock rate.

FIG. 9 is a timing diagram illustrating the operation of the circuit of FIG. 8 for input images provided at 60 Hz. It will be noted that lines 136, 138, 140, 142 and 144 correspond to the lines 62, 64, 66, 68 and 70, respectively, of FIG. 4. Accordingly, the meaning of these lines will not be explained again here. It will also be noted that the content of lines 146 and 148 corresponds to the content of line 72 of FIG. 4, if the boxes from the lines 146 and 148 are read alternately. The boxes in lines 146 and 148 are twice the width of those of line 72 (i.e. they represent twice the period of time). Similarly, the content of the lines 150 and 152 of FIG. 9 corresponds to that of the line 74 of FIG. 4 if the boxes from the lines 150 and 152 are read alternately, the boxes in lines 150 and 152 also being twice the width of the boxes in line 74 (i.e. they represent twice the period of time).

FIG. 10 is a timing diagram illustrating the operation of the circuit of FIG. 4 for input images provided at 30 Hz. It will be noted that lines 154, 156, 158, 160 and 162 correspond to the lines 76, 78, 80, 82 and 84, respectively, of FIG. 5. Accordingly, the meaning of these lines will not be explained again here. It will also be noted that the content of lines 164 and 166 corresponds to the content of line 86 of FIG. 5, if the boxes from the lines 164 and 166 are read alternately. The boxes in lines 164 and 166 are twice the width of those of line 86 (i .e. they represent twice the period of time). Similarly, the content of the lines 168 and 170 of FIG. 10 corresponds to that of the line 88 of FIG. 5 if the boxes from the lines 168 and 170 are read alternately. The boxes in lines 168 and 170 being twice the width of the boxes in line 88 (i.e. they represent twice the period of time).

Accordingly, it will be appreciated that the control logic of FIG. 8 generates essentially the same information as that of FIG. 3, except that the output is produced in two parallel channels of paths at half the rate the data is produced in the one channel or path of FIG. 3.

Comparison of FIGS. 9 and 10 will illustrate that the time base changer of FIGS. 7 and 8 is able automatically to select successive pairs of video frames from the frame stores FS0-FS6 and automatically to generate corresponding interpolation coefficients, irrespective of the input frequencies.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, whereas embodiments are shown where the time base changer outputs either one or two sequences of pairs of video signals, it will be appreciated that the invention also includes the general case where M sequences of pairs of video images (M being a positive integer 1, 2, 3, . . . etc) are provided. The need for a higher number of output channels from the time base changer could, for example, arise as a result of vector processing requirements.

I claim:

1. A time base changer for a video converter for converting between a sequence of input video images at an input video rate and a sequence of output video images at an output video rate, said time base changer comprising:
- N video stores, where N is an integer greater than one, each for storing a video image;
- means for enabling said video stores cyclically in turn and at said input video rate for storing successive input video images in successive said video stores;
- multiplexer means connected to said video stores for outputting said video images stored therein;
- control means successively providing multiplexer control signals at said output video rate to said multiplexer means for selecting adjacent pairs of the video stores such that a sequence of pairs of the video images are output from said video stores via said multiplexer means at said output video rate;
- wherein said input video rate is a selectable one of a plurality of rates and wherein said enabling means comprises a counter clocked at said selected input video rate.

2. A time base changer as claimed in claim 1 wherein said counter is a modulo-N counter.

3. A time base changer as claimed in claim 2 wherein said enabling means comprises a decoder connected to the output of the modulo-N counter, and said decoder comprises N outputs, each of which is connected to a write enable input of a respective video store, whereby each count of said modulo-N counter enables a different one of said video stores.

4. A time base changer as claimed in claim 1 wherein said control means includes means for sampling an output of said counter at said output video rate for generating said multiplexer control signals.

5. A time base changer as claimed in claim 4 wherein said sampling means comprises a clocked register, said register being clocked at said output video rate.

6. A time base changer as claimed in claim 5 wherein said control means comprises delay means connected to an output of said sampling means and said delay means being clocked at said output video rate.

7. A time base changer as claimed in claim 6 wherein said delay means comprises two delay buffers clocked at said output video rate.

8. A time base changer as claimed in claim 6 wherein said multiplexer means comprises a pair of multiplexers, said control means includes an output stage including means for incrementing modulo-N an output of said delay means and said control means producing first multiplexer control signals from the output of said delay means for controlling a first of said pair of multiplexers and producing second multiplexer control signals from the output of said modulo-N incrementing means for controlling a second of said pair of multiplexers, whereby said pair of multiplexers selects the sequence of pairs of the video images from adjacent video stores at said output video rate.

9. A time base changer as claimed in claim 1 comprising an interpolation counter clocked at a rate higher than said input video rate and reset at said input video rate, count sampling means clocked at said output video rate for sampling an output of said interpolation counter, a coefficient memory connected to an output of said count sampling means whereby said output of said count sampling means addresses said coefficient memory for outputting interpolation coefficients at said output video rate and in synchronism with the generation of corresponding pairs of the video images, each interpolation coefficient defining interpolation factors for combining a respective pair of the video images to generate said sequence of output video images at said output video rate.

10. A time base changer as claimed in claim 6 wherein said multiplexer means comprises a plurality of m pairs of multiplexers, where m is an integer greater than one, and wherein said control means includes m output stages, one for each respective pair of multiplexers, each of said m output stages including an additional sampling means for sampling the output of said delay means at one mth of said output video rate and means for incrementing modulo-N the output of the additional sampling means, each of said m output stages producing first multiplexer control signals from said output of said additional sampling means for controlling a first multiplexer of said respective pair of multiplexers and producing second multiplexer control signals from an output of said modulo-N incrementing means for Controlling a second multiplexer of said respective pair of multiplexers, whereby said respective pair of multiplexers selects the sequence of pairs of the video images from adjacent video stores at one mth of said output video rate and wherein said additional sampling means of a first of said output stages is connected to an output of said delay means and wherein said additional sampling means of a second of said output stages is connected to the output of said delay means via a delay stage clocked at said output video rate.

11. A time base changer as claimed in claim 10 comprising an interpolation counter clocked at a rate higher than said input video rate and reset at said input video rate, count sampling means clocked at said output video rate for sampling an output of said interpolation counter, a coefficient memory connected to an output of said count sampling means whereby said output of said count sampling means addresses said coefficient memory for outputting interpolation coefficients at said output video rate, and m interpolation coefficient output stages, each comprising a further sampling means clocked at one mth of said output video rate, for outputting interpolation coefficients at one mth of said output video rate and in synchronism with the generation of corresponding pairs of the video images from the respective pairs of multiplexers, each interpolation coefficient defining interpolation factors for combining a respective pair of the video images to generate said sequence of output video images.

12. A time base changer as claimed in claim 9 comprising delay means clocked at said output video rate for ensuring that said interpolation coefficients are supplied in synchronism with the generation of the corresponding pairs of the video images.

13. A time base changer as claimed in claim 9 wherein said input video rate is selectable between 30 and 60 Hz.

14. A time base changer as claimed in claim 13 wherein said output video rate is 50 Hz.

15. A time base changer as claimed in claim 1 wherein said output video rate is 50 Hz.

16. A time base changer as claimed in claim 1 wherein N=7.

17. A time base changer as claimed in claim 1 wherein the video stores are frame stores.

18. A video converter for converting between a sequence of input video images at an input video rate and a sequence of output video images at an output video rate comprising a time base changer as claimed in claim 1.

* * * * *